(12) United States Patent
Alfawy et al.

(10) Patent No.: US 11,451,138 B2
(45) Date of Patent: Sep. 20, 2022

(54) DRIVER CIRCUIT AND CORRESPONDING METHODS

(71) Applicant: Infineon Technologies Austria AG, Villach (AT)

(72) Inventors: Eslam Ramadan Mohamed Alfawy, Villach (AT); Severin Kampl, Villach (AT); Uwe Kirchner, St. Michael i. Lav. (AT)

(73) Assignee: Infineon Technologies Austria AG, Villach (AT)

( * ) Notice: Subject to any disclaimer, the term of this patent is extended or adjusted under 35 U.S.C. 154(b) by 962 days.

(21) Appl. No.: 15/953,733

(22) Filed: Apr. 16, 2018

(65) Prior Publication Data

US 2018/0301982 A1 Oct. 18, 2018

(30) Foreign Application Priority Data

Apr. 18, 2017 (DE) ............ 10 2017 108 159.3

(51) Int. Cl.
| | |
|---|---|
| *H02P 27/00* | (2006.01) |
| *H02M 1/38* | (2007.01) |
| *H02P 27/06* | (2006.01) |
| *H02M 1/08* | (2006.01) |
| H02M 7/5387 | (2007.01) |
| H02M 1/00 | (2006.01) |
| H02M 7/48 | (2007.01) |

(52) U.S. Cl.
CPC ............ *H02M 1/38* (2013.01); *H02M 1/08* (2013.01); *H02P 27/06* (2013.01); H02M 1/0048 (2021.05); H02M 1/385 (2021.05); H02M 7/4811 (2021.05); H02M 7/5387 (2013.01)

(58) Field of Classification Search
CPC .. H02M 1/08; H02M 1/38; H02M 2001/0048; H02M 2001/385; H02M 2007/4811; H02M 7/5387; H02P 27/06
USPC ........................................ 318/504
See application file for complete search history.

(56) References Cited

U.S. PATENT DOCUMENTS

| | | | | |
|---|---|---|---|---|
| 5,493,189 A | * | 2/1996 | Ling ................ | H02P 6/10 318/400.23 |
| 6,137,256 A | * | 10/2000 | Morris ............. | H02P 25/092 318/254.2 |
| 2003/0057916 A1 | * | 3/2003 | Davis .............. | H02P 7/2815 318/800 |
| 2007/0216469 A1 | * | 9/2007 | Sakamoto ....... | H03K 17/063 327/519 |
| 2011/0116294 A1 | * | 5/2011 | Wolf ............... | H02M 7/521 363/132 |

(Continued)

FOREIGN PATENT DOCUMENTS

| | | |
|---|---|---|
| DE | 10 2008032 876 A1 | 1/2010 |
| DE | 10 2013214 224 A1 | 1/2014 |

OTHER PUBLICATIONS

Office action, application No. 10 2017 108 159.3, dated Mar. 5, 2018, pp. 7.

*Primary Examiner* — Kawing Chan
*Assistant Examiner* — Gabriel Agared
(74) *Attorney, Agent, or Firm* — Armis IP Law, LLC

(57) ABSTRACT

Driver circuits are disclosed having a high-side switch and a low-side switch. A pre-charging circuit is provided to pre-charge the low-side switch. In other implementations, methods are disclosed which involve precharging a low-side switch.

15 Claims, 8 Drawing Sheets

(56) References Cited

U.S. PATENT DOCUMENTS

| | | | |
|---|---|---|---|
| 2014/0021932 A1* | 1/2014 | Ejury | G05F 3/02 |
| | | | 323/311 |
| 2014/0167655 A1* | 6/2014 | Chatroux | H02J 7/36 |
| | | | 318/139 |
| 2016/0181914 A1* | 6/2016 | Knoedgen | H02P 1/18 |
| | | | 318/504 |

* cited by examiner

DRIVER CIRCUIT AND CORRESPONDING METHODS

RELATED APPLICATION

This application is related to and claims priority to earlier filed German Patent Application Serial Number 10 2017 108 159.3 entitled "DRIVER CIRCUIT AND CORRESPONDING METHODS," (German Attorney Docket No. 31566DE), filed on Apr. 18, 2017, the entire teachings of which are incorporated herein by this reference.

BACKGROUND

Driver circuits are used to supply currents to various devices in a well-defined way. Examples include driver circuits for electric motors, which are used in a variety of applications like pumps or air conditioning blowers or compressors in fridges, freezers or air conditioning devices.

In such driver circuits, often switches in a half-bridge configuration including two switches, often referred to as high-side switch and low-side switch, are used to selectively couple either a first terminal (for example positive voltage) or a second terminal (for example negative voltage) of a power source to an output node of the driver circuit, to supply a device coupled to this output node of the driver circuit with power. As switches, nowadays, often transistors are used.

In operating such half-bridges, care has to be taken that not both switches of the half-bridge are conducting at the same time, as this may cause a short circuit of the power source. Therefore, usually some guard time, also referred to as dead time, is left between switching one of the switches off and the other one of the switches on. During such dead times, current may be conducted via diodes coupled in parallel to the switches or inherent to the switches. For example, power MOSFETs like superjunction MOSFETS in common implementations have a so-called body diode, which may conduct current during the dead time. However, such conducting of current by the body diode causes relative high losses and may therefore undesirable for some applications.

BRIEF DESCRIPTION

Embodiments herein include driver circuits and associated methods where the above problem is at least reduced.

According to an embodiment, a driver circuit is provided, comprising: a high-side switch, a low-side switch coupled to the high-side switch with an output node of the driver circuit between the high-side switch and the low-side switch, and a pre-charging circuit configured to selectively apply a bias voltage to the low-side switch.

According to another embodiment, a driver circuit is provided, the driver circuit comprising: a first high-side switch, a second high-side switch and a third high-side switch, wherein first load terminals of each of the first, second and third high-side switches are to be coupled to a first terminal of a first voltage source, a first low-side switch, a second low-side switch and a third low-side switch, wherein second load terminals of each of the first, second and third low-side switches are to be coupled to a second terminal of the first voltage source, wherein a second load terminal of the first high-side switch is coupled with a first load terminal of the first low-side switch at a first output node, wherein a second load terminal of the second high-side switch is coupled to a first load terminal of the second low-side switch at a second output terminal, and wherein a second load terminal of the third high-side switch is coupled to a first load terminal of the third low-side switch at a third output node, and a pre-charging circuit, wherein a terminal of the pre-charging circuit is to be coupled to a second voltage source and wherein the pre-charging circuit is coupled to each of the first, second and third output nodes for pre-charging the first, second and third low-side switches.

According to yet another embodiment, a method is provided, comprising: closing one of a high-side switch or a low-side switch of a driver circuit, opening the one of the high-side switch or the low-side switch, pre-charging the low-side switch while both high-side switch and low-side switch are open, closing the other one of the high-side switch and the low-side switch, and opening the other one of the high-side switch and the low-side switch.

Further embodiments herein include an apparatus comprising: a high side switch; a low side switch coupled in series with the high side switch, a node coupling the high side switch to the low side switch; a controller to selectively controls states of the high side switch and the low side switch to drive a load; and a pre-charge circuit operable to pre-charge the node while the high side switch and the low side switch are both in an open state.

In one embodiment, the pre-charge circuit includes a voltage source and a corresponding switch, the corresponding switch operable to convey a voltage produced by the voltage source to the node to pre-charge the node.

In accordance with further embodiments, the corresponding switch is operable to convey the voltage to the node while the high side switch and the low side switch are both in an open state.

In yet further embodiments, the load is a winding of a motor.

In still further embodiments, the pre-charge circuit includes a voltage source, a corresponding switch, and an inductor element coupled between the corresponding switch and the node, the corresponding switch operable to convey a voltage produced by the voltage source to the inductor through which current passes to pre-charge the node.

In one embodiment, the pre-charging of the low side switch is operable to reduce a current flowing through a body diode of the low-side switch during dead time when both the high-side switch and low-side switch are open.

In accordance with further embodiments, current flows from the load to the node during a dead time in which both the high side switch and the low side switch are both controlled to be in the open state. Pre-charging the node is operable to speed recovery of a parasitic diode of the low side switch, preventing current from the load to flow through the parasitic diode of the low side switch.

The above summary is merely intended to give a brief overview over some features of some embodiments and is not to be construed as limiting. In particular, other embodiments may comprise other features than the ones explicitly mentioned above. Embodiments herein include novel ways of providing accurate voltage regulation in a switching power supply.

DETAILED DESCRIPTION

Figure 1:
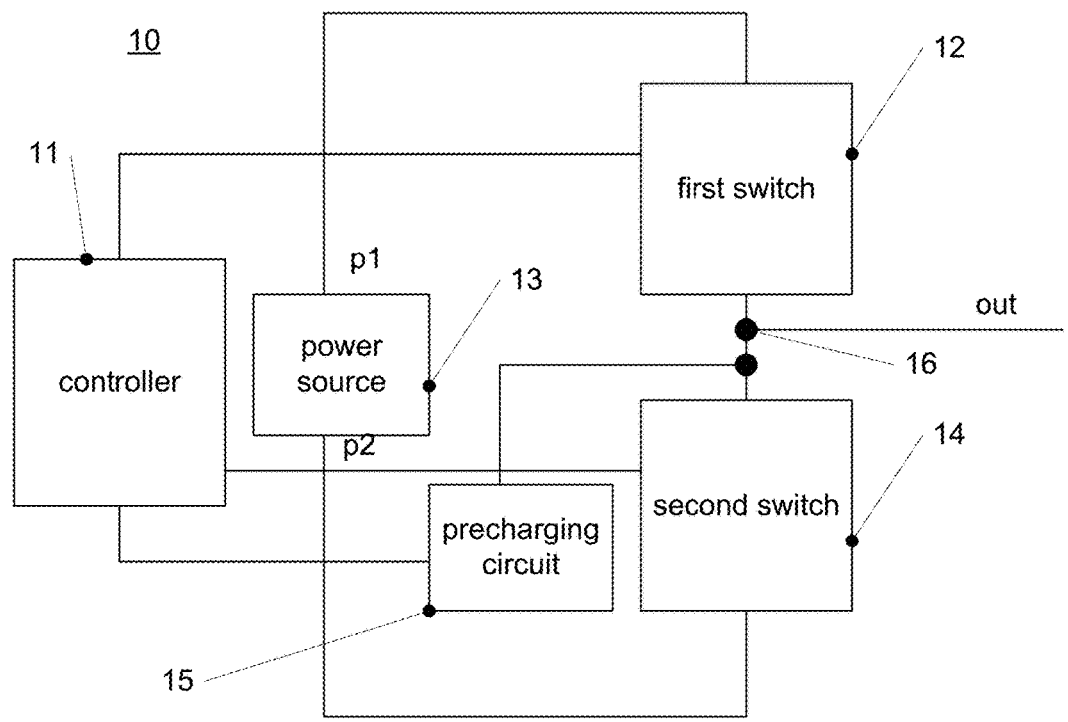
FIG. 1 is a block diagram of a driver circuit according to an embodiment.

In the following, various embodiments will be described in detail referring to the attached drawings. These embodiments are given by way of example only and are not to be construed as limiting. For example, while embodiments may be described as comprising a plurality of features, elements or components, in other embodiments, some of these features, elements or components may be omitted and/or may be replaced by alternative features, elements or components. Furthermore, in addition to the features or elements explicitly shown or described herein, other features or elements, for example features or elements used in conventional driver circuits and/or half-bridge circuits, may be employed.

Features from different embodiments may be combined to form further embodiments. Variations or modifications described with respect to one of the embodiments may also be applied to other embodiments.

In the embodiments shown and described, any direct electrical connection or coupling, i.e. connection or coupling without additional intervening element, may be replaced by an indirect connection or coupling, i.e. a connection or coupling comprising one or more additional intervening elements, and vice versa, as long as the general function and purpose of the connection or coupling, for example to transmit a voltage and/or current, transmit an information signal or to provide a certain kind of control, is essentially maintained. In other words, modifications to the connections and couplings shown may be employed as long as they do not significantly alter the functioning of the connection or coupling. For example, couplings may be via resistors or without intervening transistors while still transmitting essentially the same signal in some cases.

Embodiments described herein use switches. Switches may be implemented using transistors, for example power transistors designed to carry a current of one 1 AMPERE or more, but not limited to such power transistors or load currents and may be employed at any load currents. Switches as used herein may be described as comprising a control terminal and first or second load terminals. Based on a signal applied to the control terminal, the switch is conducting, i.e. provides a low ohmic connection between the first and second load terminals, or essentially non-conducting between its first and second load terminals. "Essentially non-conducting" in this respect means an isolation apart from possibly unwanted leakage current and similar parasitic effects, which may occur in real devices. The conducting state is also referred to as closed state or on state herein, and the non-conducting state of the switch is also referred to as open or off state.

Transistors may for example be field effect transistors like metal oxide semiconductor field effect transistors (MOSFETs), in particular superjunction MOSFETs. In this case, the control terminal corresponds to the gate terminal, and the first and second load terminals correspond to the source and drain terminals.

Such MOSFET transistors in many implementations inherently comprise a body diode. Some embodiments discussed herein contribute to reduce power dissipation in such a body diode. Other transistor types or switches may be separately provided with a corresponding diode, also referred to as freewheeling diode, and the techniques discussed herein may also be applicable to such other types of switches.

Turning now to the figures, FIG. 1 is a block diagram of a driver circuit according to an embodiment. The embodiment of FIG. 1 comprises a first switch 12, also referred to as high-side switch, and a second switch 14, also referred to as low-side switch. First switch 12 and second switch 14 are provided in a half-bridge configuration, where a node 16 between the first switch and the second switch serves as an output node for outputting an output signal out.

In the embodiment of FIG. 1, a second load terminal of first switch 12 and a first load terminal of second switch 14 are coupled to output node 16. A first load terminal of first switch 12 is coupled to a first terminal p1 (for example positive voltage terminal) of a power source 13, and a second load terminal 14 is coupled to a second terminal p2 (for example negative voltage) of power source 13.

A controller 11 controls first switch 12 and second switch 14. At least in some phases of operation, when first switch 12 is closed, second switch 14 is opened, and therefore output node 16 is coupled to first terminal P1 of power source 13. When second switch 14 is closed, first switch 12 is opened, such that output node 16 is coupled to second terminal P2 of power source 13. In some applications, second terminal P2 may be coupled to ground. Controller 11 may be implemented in any suitable manner, for example as logic circuit, as correspondingly programmed processor or as an application specific integrated circuit (ASIC), but is not limited thereto.

As can be easily understood in FIG. 1, if first switch 12 and second switch 14 were simultaneously closed, a short circuit of power source would result. Therefore, in embodiments for example between opening first switch 12 and closing second switch 14 and between opening second switch 14 and closing first switch 12, a dead time is provided where both first and second switches 12, 14 are opened to prevent such a short circuit condition.

The embodiment of FIG. 1 further comprises a pre-charging circuit 15 controlled by controller 11. Pre-charging circuit 15 is configured to selectively pre-charge second switch 14. In embodiments, controller 11 activates pre-charging circuit 15 during at least some of the above-mentioned dead time, for example between opening first switch 12 and closing second switch 14, between opening second switch 14 and closing first switch 12 or both. In some embodiments, this prevents a body diode or other diode of second switch 14 from conducting or at least reduces current conducted by the body diode or other diode of second switch 14. In some embodiments, this may contribute to reducing losses.

Thus, according to embodiments herein, apparatus 10 includes a high side switch 12; a low side switch 14 coupled in series with the high side switch 12, a node 16 coupling the high side switch 12 to the low side switch 14; a controller 11 to selectively control states of the high side switch 12 and the low side switch 14 to drive a load; and a pre-charge circuit 15 operable to pre-charge the node 16 while the high side switch 12 and the low side switch 14 are both in an open state.

Figure 2:
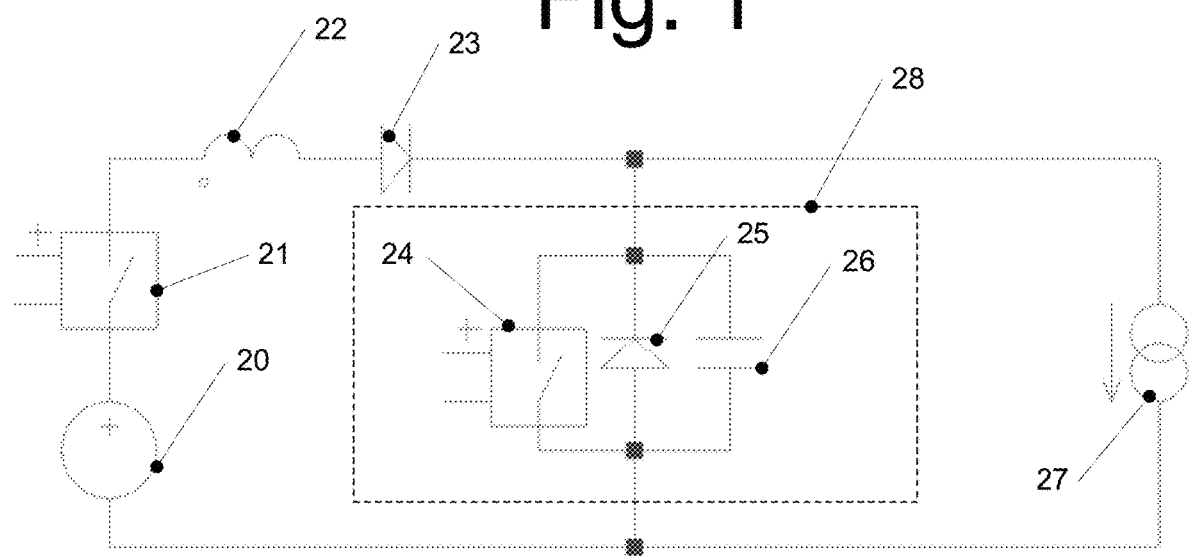
FIG. 2 is a circuit diagram of a part of a driver circuit according to an embodiment.

FIG. 2 illustrates a circuit diagram showing a part of a driver device according to an embodiment. FIG. 2 illustrates an example for a pre-charging circuit like pre-charging circuit 15 of FIG. 1 pre-charging a switch, for example second switch 14 of FIG. 1. While for ease of illustration reference to FIG. 1 is made, the circuit of FIG. 2 is also applicable to other driver circuits than the one shown in FIG. 1.

In FIG. 2, as a switch an MOSFET transistor 28 (e.g. superjunction MOSFET) represented by an equivalent circuit comprising a switch 24, a body diode 25 and a capacitance 26 coupled in parallel is used. Capacitance 26 may represent a parasitic capacitance and/or output capacitance of the MOSFET transistor.

A pre-charging circuit in FIG. 2 comprises a voltage source 20, a switch 21, an inductivity 22 and a diode 23. Instead of diode 23, other components having a diode-like behavior may be used, for example MOSFET transistor coupled as diodes, also referred to as biased MOSFET. Such components will generically referred to as diode components herein.

Inductivity 22 (inductor) serves to limit the current flowing when switch 21 is closed for pre-charging, and diode 23 prevents a reverse current flow. Voltage source 20 may provide a voltage different from a voltage provided by a power source like power source 13, for example a lower voltage, but is not limited thereto.

When current flows from a load during the above-mentioned dead time as represented by a current source 27, pre-charging MOSFET transistor 28 (such as second switch 14) by closing switch 21 may speed recovery of diode 25 to prevent current generated by current source 27 to flow via diode 25, which in turn may reduce losses. Such a current flow as indicated by current source 27 may for example be due to energy stored in inductivities (inductance) of a load. This in particular is the case in motor drive applications, where the driver circuit shown is used to provide energy to windings, i.e. inductors, of an electric motor.

Figure 3:
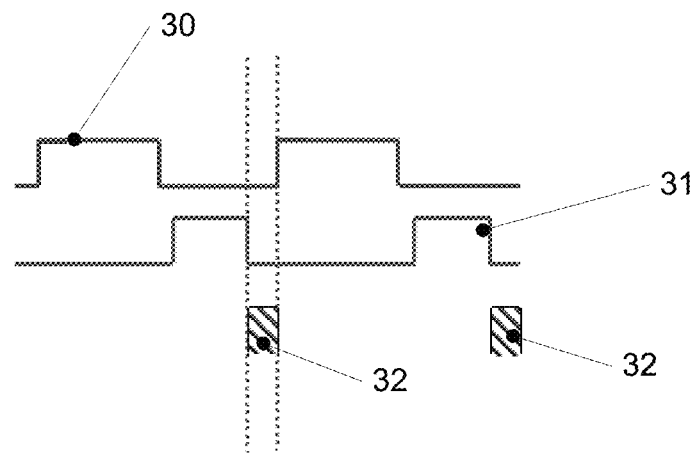
FIG. 3 is a timing diagram of a driver circuit of an embodiment.

FIG. 3 illustrates an example timing diagram for such a pre-charging. A curve 30 illustrates control of a first switch of a half-bridge (e.g. high-side switch), a curve 31 illustrates control of a second switch of the half-bridge (e.g. low-side switch), and sections 32 illustrate control of pre-charging during at least some dead times.

Figure 4:
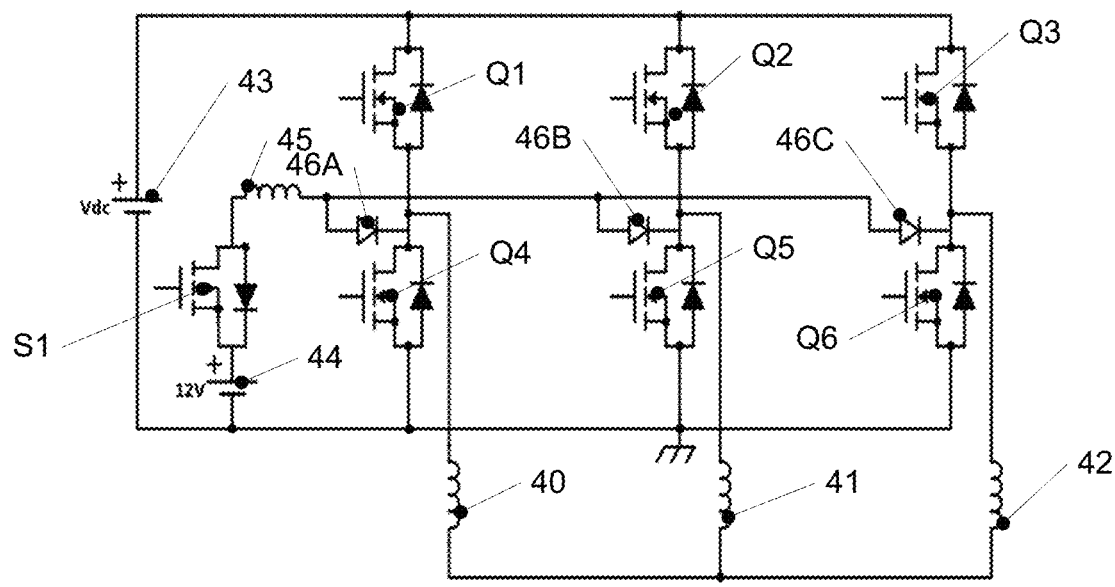
FIG. 4 is a circuit diagram illustrating a driver circuit according to an embodiment.

FIG. 4 illustrates a circuit diagram of a driver circuit according to an embodiment for driving a three phase electric motor, represented by three windings 40, 41 and 42 in the embodiment of FIG. 4. The driver circuit of FIG. 4 comprises six switch transistors Q1-Q6, which are arranged in three half-bridges, each half-bridge for driving one of windings 40, 41 and 42. Q1-Q3 are high-side switches, and Q4-Q6 are low-side switches. In particular, in the embodiment of FIG. 4, winding 40 is driven by a half-bridge comprising switches Q1, Q4, winding 41 is driven by a half-bridge comprising switches Q2, Q5, and winding 42 is driven by a half-bridge comprising transistors Q3 and Q6. In the embodiment of FIG. 4, each of switches Q1-Q6 is implemented as a MOSFET transistor having a body diode, as shown, for example a superjunction MOSFET. Switches Q1-Q6 selectively provide a voltage from a voltage source 43, for example a battery voltage source or any other direct current (DC) voltage source, to windings 40-42. Voltage source 43 is a non-limiting example for a power source.

Furthermore, the embodiment of FIG. 4 comprises a pre-charging circuit comprising a voltage source 44, in the example of FIG. 4 a 12 V source, although other voltages may also be used depending on the implementation of switches Q1-Q6. Furthermore, the pre-charging circuit comprises a switch S1, which also may be implemented as a MOSFET transistor including a body diode, although other switch implementations like application specific integrated circuits (ASICs) may also be used. The pre-charging circuit furthermore comprises an inductor 45 to limit a current and diodes 46A to 46C coupled to respective nodes between transistors Q1 and Q4, between switches Q2 and Q5 and between switches Q3 and Q6, respectively, as shown. Inductor 45 may have an inductivity between 0.5 µH and 3 µH, for example about 1 µH, but is not limited to these values. Instead of diodes 46A to 46C, other diode components may also be used. Via inductor 45 and the respective diodes 46A to 46C, switches Q4, Q5 and Q6 may be pre-charged during at least some respective dead times of the respective half-bridge. It should be noted that while in FIG. 4 switch S1 and inductor 45 serves for pre-charging all switches Q4, Q5 and Q6, in other embodiments separate pre-charging circuits may be provided for switches Q4, Q5 and Q6, and/or different pre-charging times may be used for these switches.

Thus, in accordance with embodiments herein, the pre-charge circuit includes a voltage source 44, a corresponding switch S1, inductor 45, and diode 46A, the corresponding switch S1 being operable to convey a voltage (such as +12 volts or other suitable voltage) produced by the voltage source 44 through the inductor 45 and diode 46A to the common node (coupled to motor winding 40) connecting Q1 and Q4 while the high side switch Q1 and the low side switch Q4 are both in an open state. In one embodiment, the pre-charging circuit drives all common nodes at the same time.

In one embodiment, current flows from the load (winding 40) to the common node during a dead time in which both the high side switch Q1 and the low side switch Q4 are both controlled to be in the open state. Pre-charging of the common node is operable to speed recovery of a parasitic diode of the low side switch Q4, preventing current from the load to flow through the node and the parasitic diode of the low side switch to the ground of voltage source 43. Thus, in one embodiment, pre-charging of the low side switch is operable to reduce a current flowing through a body diode of the low-side switch Q4 (and othe rsws Q5 and Q6) during dead time when both the respective high-side switches and low-side switches are open.

Figure 5:
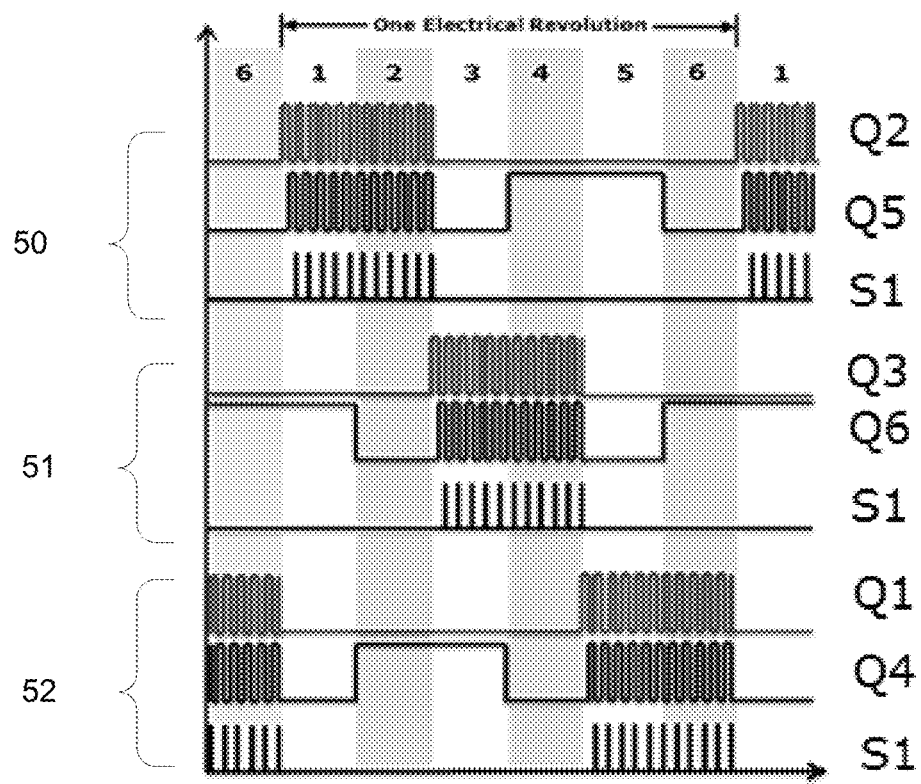
FIG. 5 is an example timing diagram for the driver circuit of FIG. 4.

To further illustrate, FIG. 5 shows an example signal diagram for operating the circuit of FIG. 4. In particular, FIG. 5 illustrates opening and closing of each of switches Q1-Q6. A section 50 relates to the switching of Q2 and Q5, i.e. supplying winding 41 with power, a section 51 relates to operation of switches Q3 and Q6, i.e. supplying winding 42 with power, and a section 52 relates to operation of switches Q1 and Q4, i.e. supplying winding 40 with power. In each of sections 50-52, switching of switch S1 is also illustrated. The signals S1 from sections 50, 51 and 52 together give the overall switching of switch S1 in the example shown. Nevertheless, it is to be noted that the operation shown in FIG. 5 serves merely as an example, and in other embodiments, other schemes may be used to operate the switches.

One electrical revolution of the motor may be divided into six phases as illustrated in FIG. 5. During phases 1 and 2, switches Q2 and Q5 are alternatingly opened and closed, and in dead times in between the pre-charging circuit is activated by closing switch S1. Furthermore, in phases 1 and 2, in phase 1 switch Q6 is permanently closed, and in phase 2 switch Q4 is permanently closed, as seen in the diagram. Similar manner, in phases 3 and 4, switches Q3, Q6 are alternatingly opened and closed, and switch S1 is closed in the dead times therebetween, and in phases 5 and 6 switches Q1 and Q4 are alternatingly closed, and switch S1 is closed in the dead times therebetween.

The current flow for these phases will now be explained in some more detail using phase 1 as an example, where switches Q2, Q5 are alternatingly opened and closed and switch Q6 is permanently closed.

Figure 6A:
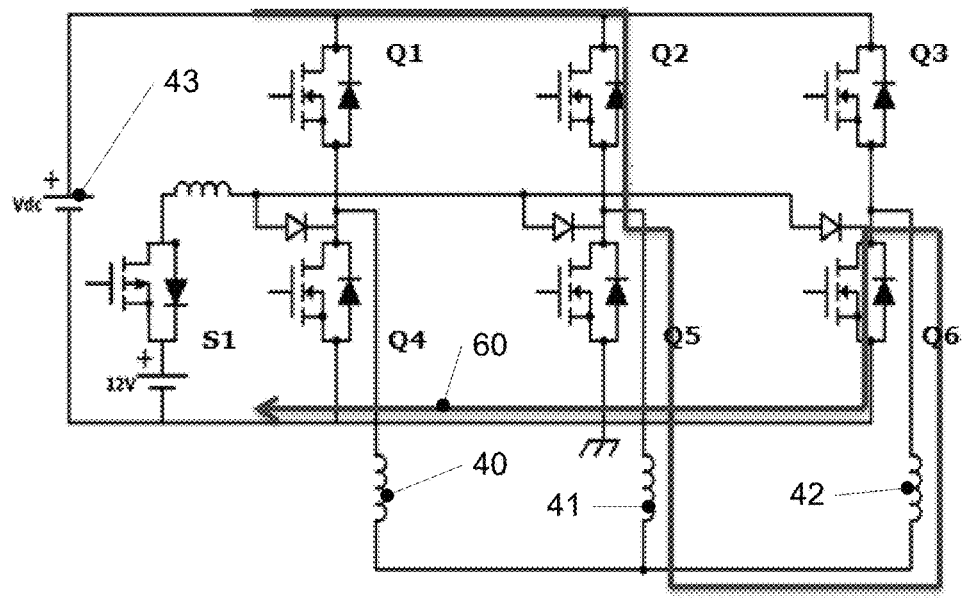
FIGS. 6A to 6C are diagrams illustrating current flow in the driver circuit of FIG. 4 in various phases of operation.

FIG. 6A illustrates the current flow in phase 1 of FIG. 5 in a state when switch Q2 is closed, switch Q5 is open and (as during the complete phase 1) switch Q6 is closed. Here, current flows as indicated by an arrow 60 from current source 43 via switch Q2 to winding 41 and back via winding 42 and switch Q6 to voltage source 43.

Figure 6B:
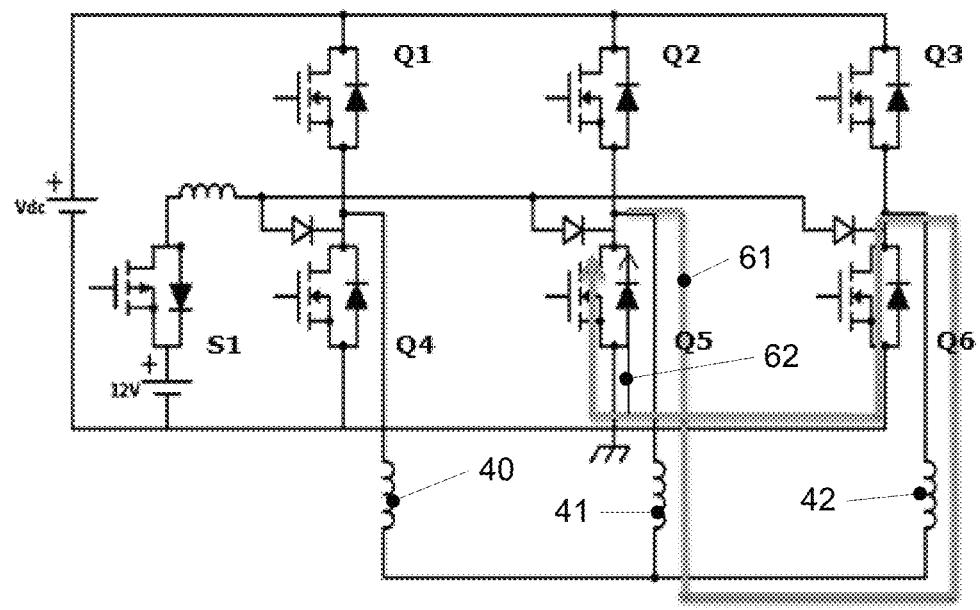

FIG. 6B illustrates the situation in phase 1 in a state when switch Q2 is open and switch Q5 is closed. In this case, some current flows as indicated by an arrow 60 through windings 41, 42, switch Q6 and switch Q5, which is open. This in particular may be a current due to energy stored in the windings 41, 42. Some negligible current also may flow via the body diode of switch Q5, as indicated by an arrow 62. However, this current in embodiments is significantly smaller than the current flowing via the transistor of switch Q5, and therefore this does not strongly contribute to losses in some embodiments.

Figure 6C:
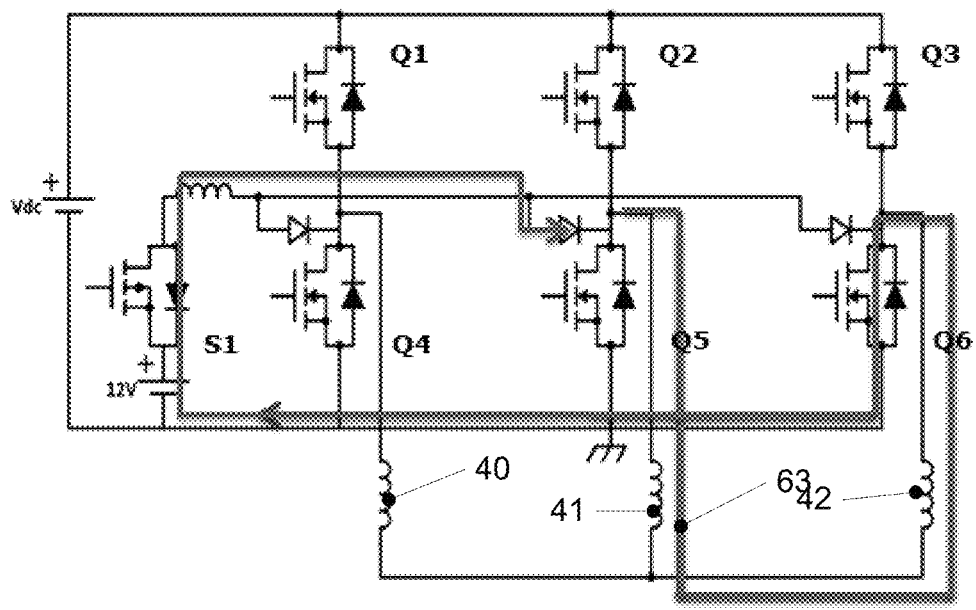

FIG. 6C illustrates current flowing in a dead time between the situations of FIG. 6A where switch Q2 is closed and the situation in FIG. 6B where switch Q5 is closed, both Q2 and Q5 being open during this dead time. During this dead time, switch S1 is closed, thus pre-charging switch Q5 by applying a bias voltage (12 V in this example, although other voltages may be used in other examples) via inductor 45 and diode 46B. This pre-charging recovers the body diode of Q5 and leads to a current flow as indicated by an arrow 63 in FIG. 6C charging for example a capacitor of Q5 (e.g. capacitor 26 of FIG. 2), with at least almost no current flowing via the body diode of Q5 and therefore reducing losses.

Figure 7:
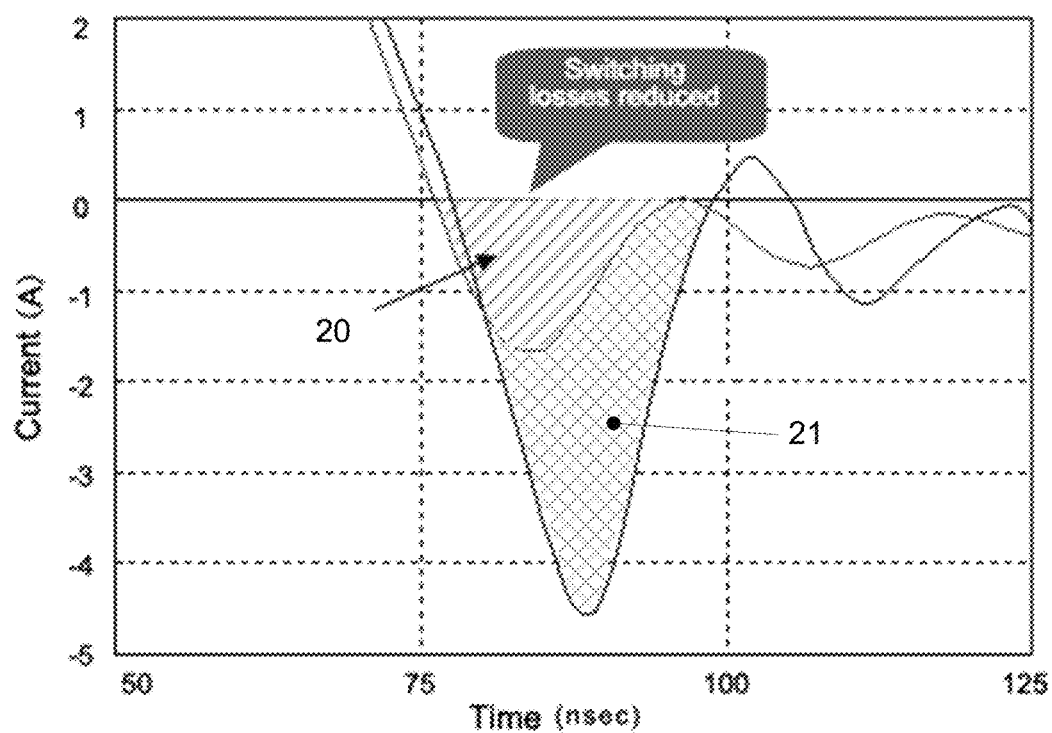
FIGS. 7 to 11 are diagrams illustrating properties of some embodiments.

This at least reducing of current flowing through the body diode of switch Q5 is illustrated in FIG. 7. FIG. 7 illustrates the current flowing via the diode during the dead time, approximately between 75 and 100 ns on the time scale of FIG. 7. A cross-hatched area 21 illustrates the current over time without the pre-charging, and a striped area 20 illustrates the current over time with pre-charging. As can be seen, the current is significantly reduced, which reduces switching losses in some embodiments. It should be noted that any example curves discussed above and in the following referring to FIGS. 7 through 11 serve only for further illustration purposes and may vary depending on the particular implementation. In particular, any numerical values given below or shown in the Figures are only examples and may vary e.g. depending on the implementation.

Figure 8:
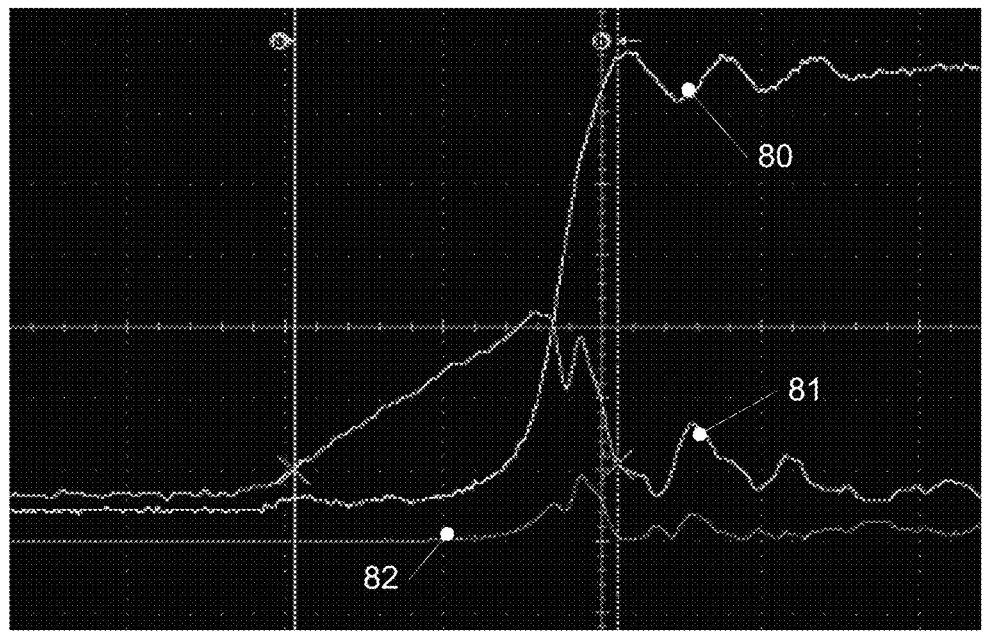

FIG. 8 illustrates the behavior at switch Q2 when switching. A curve 80 illustrates the drain source voltage at switch Q2, a curve 81 illustrates the drain source current, and a curve 82 illustrates the power dissipation. As can be seen, a comparatively sharp switching with low power dissipation is obtained in some embodiments.

Figure 9A:
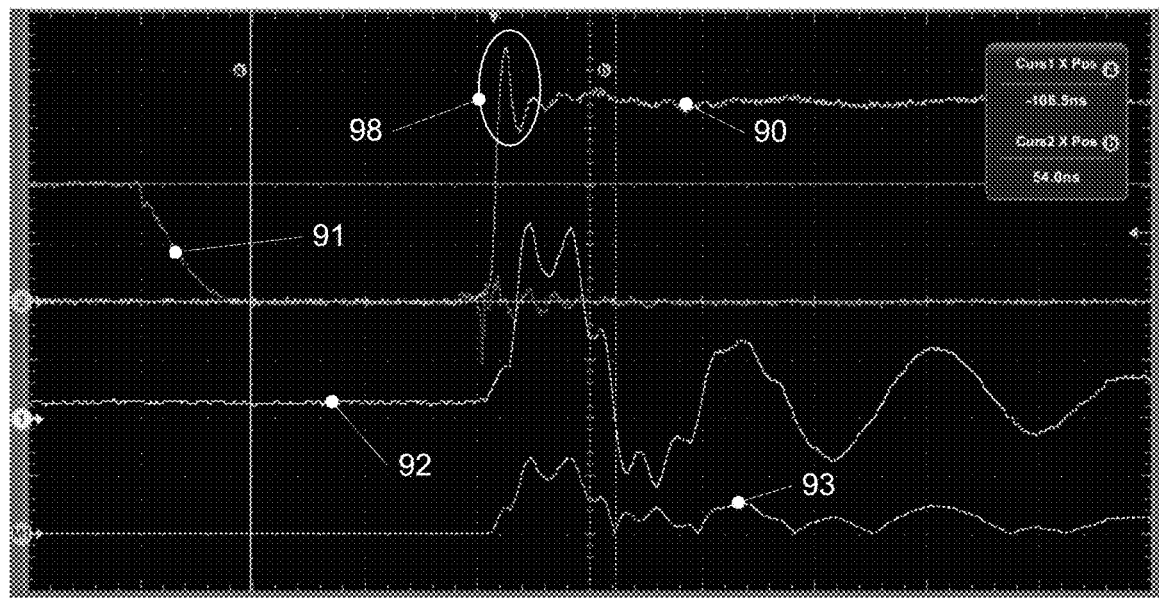
Figure 9B:
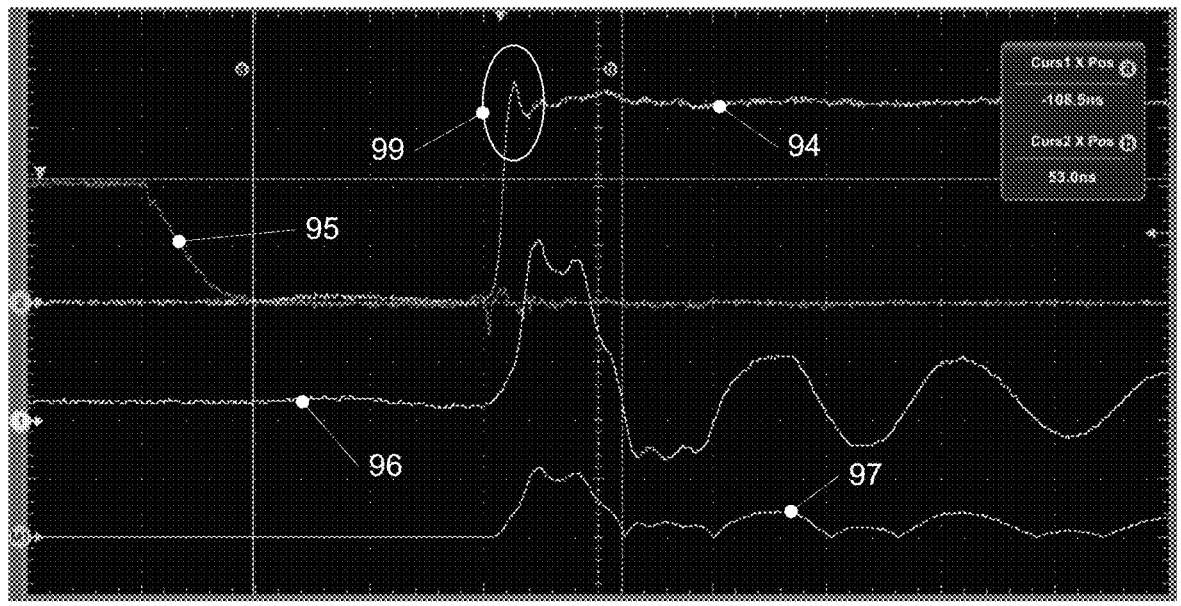

FIGS. 9A and 9B illustrate an example behavior for a particular implementation without pre-charging as discussed herein in FIG. 9A and with pre-charging as discussed herein in FIG. 9B, i.e. in FIG. 9B a pre-charging was applied to a low-side switch, for example by applying a voltage via an inductor and a diode, during a dead time.

In FIGS. 9A and 9B, curves 91 and 95, respectively, illustrate a gate-source voltage of a low-side switch (for example Q5 in FIG. 4). The dropping of this gate source voltage shown indicates the beginning of the dead time. Curves 90 and 94 illustrate the drain-source current measured at mid-point of the respective high-side switch (for example Q2), curves 92 and 96 illustrate the drain-source voltage of the high-side switch, and curves 93 and 97 illustrate the power dissipation. As can be seen, when switching the high-side switch (for example Q2) on after the dead time, some kind of voltage overshoot appears as marked by circles 98 and 99, respectively. As can also be seen, without pre-charging (FIG. 9A) the overshoot is more pronounced. In the example shown, by using the pre-charging the peak voltage of the drain-source voltage of the high-side switch (regions 98, 99) may be reduced from about 400 V to 340 V, and the peak current (curves 92, 96) may be reduced from about 3.38 A to 3.1 A. This corresponds to a reduction of losses from about 80 µJ to about 72 µJ, i.e. by about 10% in the example of FIGS. 9A and 9B.

Figure 10:
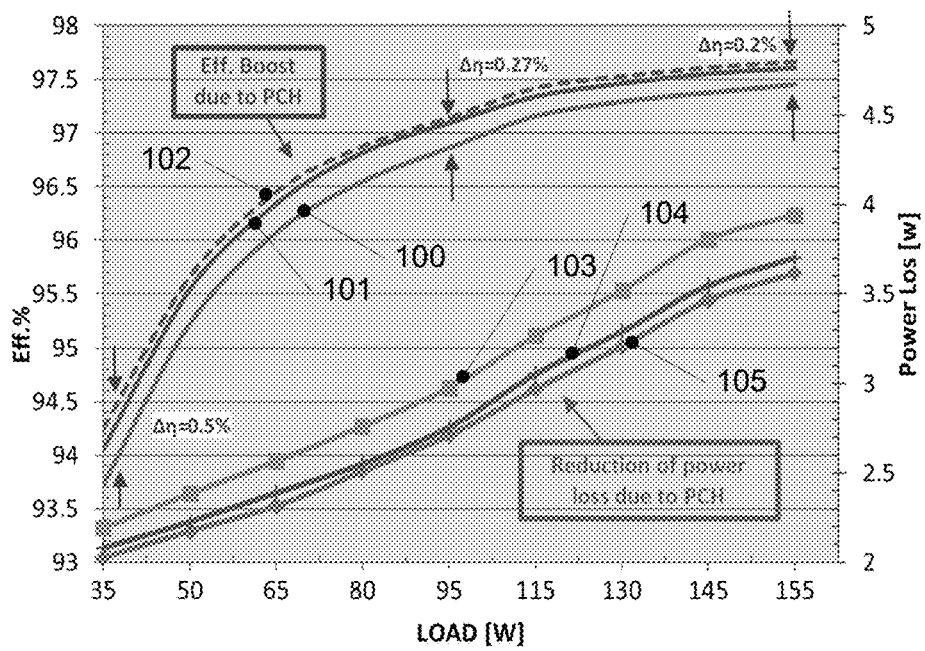

FIG. 10 illustrates switching efficiencies and power losses for driver circuits implemented according to embodiments with pre-charging compared with conventional driver circuits for various loads. As regards switching efficiencies, a curve 100 illustrates the switching efficiency for a driver circuit using conventional superjunction MOSFETs without pre-charging, a curve 101 illustrates switching efficiency with superjunction MOSFETs having an optimized body diode, which increases production costs, and a curve 102 illustrates the switching efficiency for the conventional superjunction MOSFET with pre-charging. As can be seen, with pre-charging a switching efficiency even slightly higher than the efficiency for the superjunction MOSFET with optimized body diodes is obtained, while using regular superjunction MOSFETs which are cheaper to manufacture. For conventional superjunction MOSFETs, the efficiency for example may be increased using the pre-charging by 0.5% at comparatively light loads, and still by about 0.2% at higher loads.

In a similar manner, as regards power losses, a curve 103 illustrates the power losses for using conventional superjunction MOSFETs, a curve 104 illustrates the power losses when superjunction MOSFETs with optimized body diodes are used, and a curve 105 illustrates the power losses for the use of conventional superjunction MOSFETs with pre-charging as discussed herein in a driver circuit. Also here, with pre-charging even slightly better results than for optimized superjunction MOSFETs may be obtained, while reducing costs in some implementations.

Figure 11:
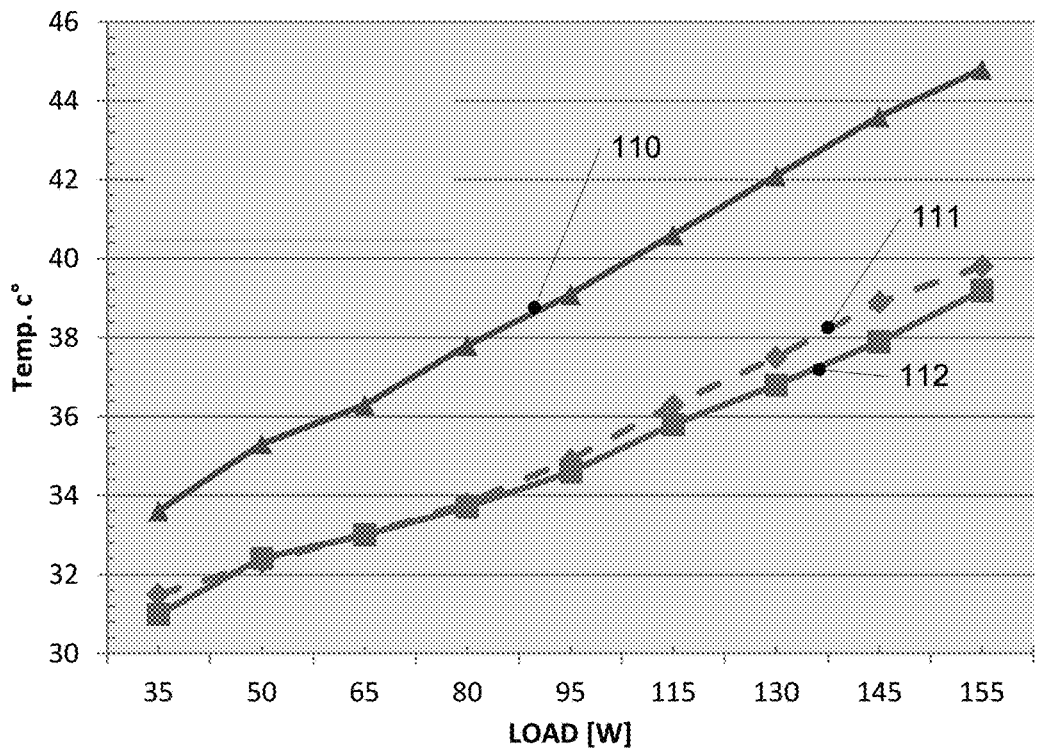

FIG. 11 illustrates the temperature of a driver circuit for the use of various superjunction MOSFETs for building the driver circuits at various loads. A curve 110 illustrates the temperature for various loads for a drive circuit using conventional superjunction MOSFETs, a curve 111 illustrates the temperature for a circuit using conventional superjunction MOSFETs with pre-charging, and a curve 112 illustrates the temperature for a drive circuit using superjunction MOSFETs with an optimized body diode, which tend to be more expensive to manufacture. As can be seen, with pre-charging even with conventional superjunction MOSFETs a similar result than for optimized superjunction MOSFETs may be obtained and a temperature reduction of about 5 C.° compared to the case of conventional superjunction MOSFETs without pre-charging is obtained. Part of the pre-charging current applied charges capacitor 26, which leads to faster switching.

Figure 12:
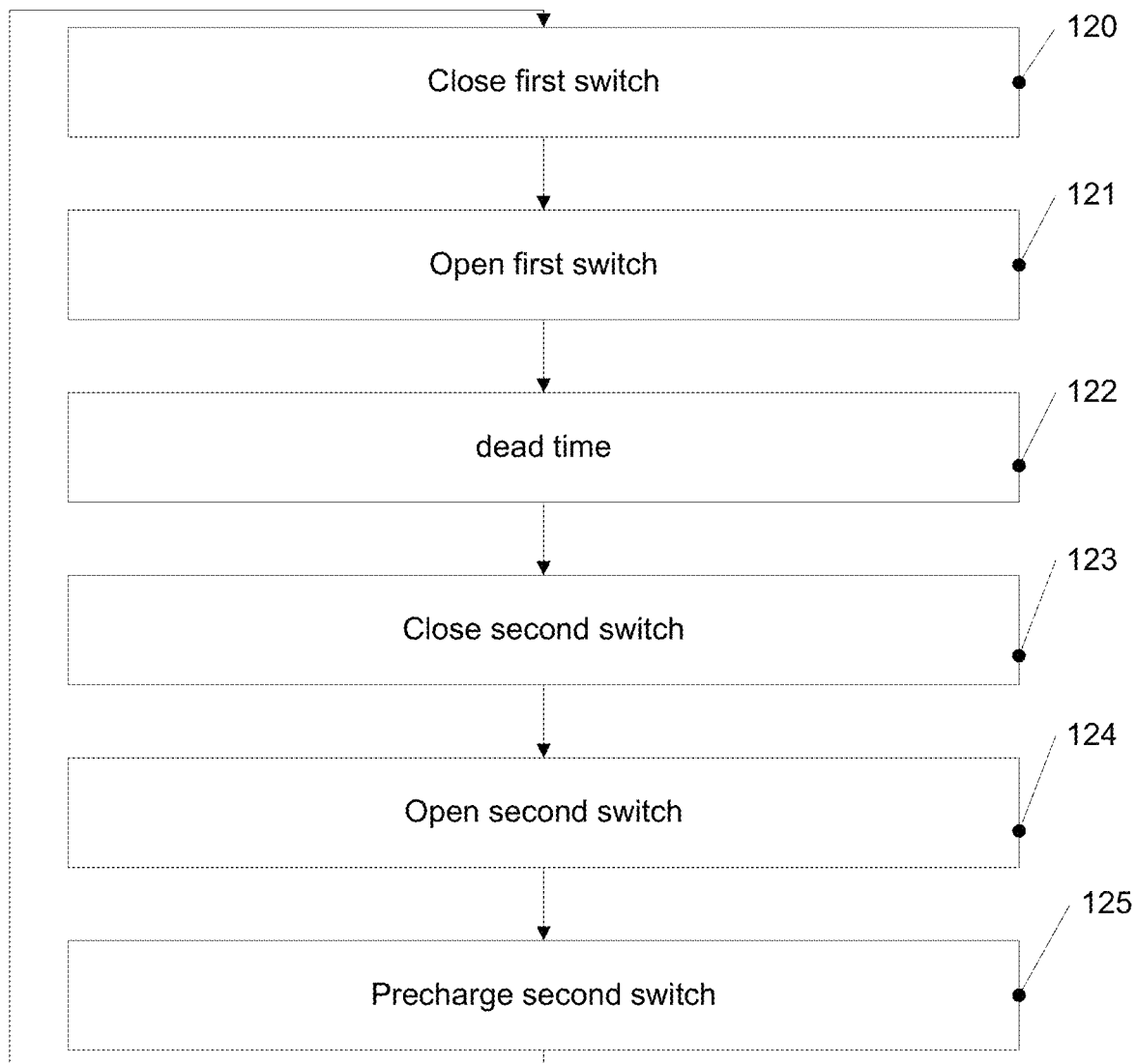
FIG. 12 is a flowchart illustrating a method according to an embodiment.

FIG. 12 is a flowchart illustrating a method according to an embodiment. The method of FIG. 12 may be implemented using any of the driver circuits discussed above and may describe a method for operating such driver circuits. For easier understanding, the method of FIG. 12 will be described referring to the previously discussed driver circuits. However, it is to be understood that the method of FIG. 12 may also be implemented in other drive circuits than the ones discussed above in detail.

At 120 in FIG. 12 a first switch of a half-bridge of a driver circuit is closed, and at 121 the first switch is opened again. The first switch may be a high-side switch, for example first switch 12 of FIG. 1 or one of switches Q1 to Q3 of FIG. 6A.

At 122, a dead time follows where current may be conducted via a body diode of a second switch, for example a low side switch. In the embodiment of FIG. 12, during this dead time no pre-charging is performed.

At 123, then the second switch is closed, and at 124 opened again.

After the opening of the second switch, the second switch, for example a corresponding low-side switch, is pre-charged at 125, for example by applying a voltage, as discussed previously. This pre-charging may recover a body diode of the second switch and charge an output capacitor of the second switch, as explained.

Therefore, the pre-charging at 125 occurs in a dead time, where both the first and second switches are opened. After 125, the method may continue at 120 to repeat the method at least during a phase of operation (for example phase 1 of FIG. 5 for Q2 and Q5 as the first and second switches, phases 3 and 4 of FIG. 5 for Q3 and Q6 being first and second switches, and phases 5 and 6 of FIG. 5 for Q1 and Q4 being first and second switches) during operation of the driver circuit. Therefore, in the embodiment of FIG. 12 pre-charging is performed only in dead times between opening the second switch and closing the first switch, but not in dead times between opening the first switch and closing the second switch, as in the former case recovery of the body diode may be more important in some applications. In other embodiments, pre-charging may be applied during all dead times, i.e. also at 122.

At least some embodiments are defined by the examples given below:

EXAMPLE 1

A driver circuit, comprising:
a high-side switch,
a low-side switch coupled to the high-side switch with an output node of the driver circuit between the high-side switch and the low-side switch, and
a pre-charging circuit configured to selectively apply a bias voltage to the low-side switch.

EXAMPLE 2

The driver circuit of example 1, further comprising a controller, wherein the controller is configured to alternatingly open and close the high-side switch and the low-side switch during at least one phase of operation of the driver circuit with dead times between the alternatingly opening and closing in which both the high-side switch and the low-side switch are open, wherein the controller is further configured to activate the pre-charge circuit during at least some of the dead times.

EXAMPLE 3

The driver circuit of example 1, wherein at least one of the high-side switch or the low-side switch comprises a metal oxide semiconductor field effect transistor having a body diode.

EXAMPLE 4

The driver circuit of example 1, wherein the high-side switch is to be coupled to a first terminal of a power source, and the low-side switch is to be coupled to a second terminal of the power source.

EXAMPLE 5

The driver circuit of example 1, wherein the pre-charging circuit comprises a switch, wherein a first load terminal of the switch is to be coupled to a voltage source and the second load terminal of the switch is coupled to the output node.

EXAMPLE 6

The driver circuit of example 5, further comprising an inductor coupled between the switch and the output node.

EXAMPLE 7

The device of example 5, wherein the pre-charging circuit comprises a diode component coupled between the pre-charging circuit and the output node.

EXAMPLE 8

A driver circuit, comprising:
a first high-side switch, a second high-side switch and a third high-side switch, wherein first load terminals of each of the first, second and third high-side switches are to be coupled to a first terminal of a first voltage source,
a first low-side switch, a second low-side switch and a third low-side switch, wherein second load terminals of each of the first, second and third low-side switches are to be coupled to a second terminal of the first voltage source,
wherein a second load terminal of the first high-side switch is coupled with a first load terminal of the first low-side switch at a first output node,
wherein a second load terminal of the second high-side switch is coupled to a first load terminal of the second low-side switch at a second output terminal, and wherein a second load terminal of the third high-side switch is coupled to a first load terminal of the third low-side switch at a third output node, and
a pre-charging circuit, wherein a terminal of the pre-charging circuit is to be coupled to a second voltage source and wherein the pre-charging circuit is coupled to each of the first, second and third output nodes for pre-charging the first, second and third low-side switches.

EXAMPLE 9

The device of example 8, wherein the first to third high-side switches and the first to third low-side switches comprise a body diode.

EXAMPLE 10

The driver circuit of example 9, wherein the first to third high-side switches and the first to third low-side switches comprise MOSFET transistors.

EXAMPLE 11

The device of example 8, wherein the pre-charging circuit comprises a switch coupled between the first terminal of the pre-charging circuit and the first, second and third output nodes.

EXAMPLE 12

The driver circuit of example 11, further comprising an inductor coupled to the switch.

EXAMPLE 13

The device of example 11, further comprising a first diode coupled between the switch and the first output node, a second diode coupled between the switch and the second output node, and a third diode coupled between the switch and the third output node.

EXAMPLE 14

The driver circuit of example 8, further comprising a controller, wherein the controller is configured to alternatingly open and close each pair of the first high-side switch and first low-side switch, the second high-side switch and the second low-side switch, and the third high-side switch and the third low-side switch in at least one respective phase of operation of the driver circuit, and in the respective phase of operation activate the pre-charging circuit in dead times where both the respective high-side switch and the respective low-side switch of the respective pair are open.

EXAMPLE 15

A method, comprising:
closing one of a high-side switch or a low-side switch of a driver circuit,
opening the one of the high-side switch or the low-side switch,
pre-charging the low-side switch while both the high-side switch and the low-side switch are open,
closing the other one of the high-side switch and the low-side switch, and
opening the other one of the high-side switch and the low-side switch.

EXAMPLE 16

The method of example 15, wherein pre-charges comprising coupling the low-side switch to a voltage source.

EXAMPLE 17

The method of example 15, wherein said pre-charging reduces a current flowing through a body diode of the low-side switch during the dead time.

EXAMPLE 18

The method example 15, wherein said pre-charging comprises charging a capacitor of the low-side switch.

EXAMPLE 19

The method of example 15, wherein the one of the high side switch or the low side switch is the low side switch.

EXAMPLE 20

The method of example 15, wherein the method comprises operating a driver circuit as defined in example 1.

As can be seen from the various modifications and variations discussed above, the embodiments shown and described serve merely as non-limiting examples and are not to be construed as limiting.

We claim:
1. A device comprising:
a first high-side switch, a second high-side switch, and a third high-side switch, wherein first terminals of each of the first high-side switch, the second high-side switch, and the third high-side switch is coupled to a first terminal of a first voltage source,
a first low-side switch, a second low-side switch, and a third low-side switch, wherein second terminals of each of the first low-side switch, second low-side switch, and the third low-side switch are coupled to a second terminal of the first voltage source,
wherein a second terminal of the first high-side switch is coupled with a first terminal of the first low-side switch at a first output node,
wherein a second terminal of the second high-side switch is coupled to a first terminal of the second low-side switch at a second output node, and
wherein a second terminal of the third high-side switch is coupled to a first terminal of the third low-side switch at a third output node, and
the device further comprising: a pre-charging circuit, wherein a terminal of the pre-charging circuit is coupled to a second voltage source and wherein the pre-charging circuit is coupled to each of the first output node, the second output node, and the third output node for pre-charging the first low-side switch, the second low-side switch, and the third low-side switch;
wherein each of the first high-side switch, the second high-side switch, and the third high-side switch and the first low-side switch, the second low-side switch, and the third low-side switch include a body diode;
wherein the first high-side switch, the second high-side switch, and the third high-side switch and the first low-side switch, the second low-side switch, and the third low-side switch are MOSFET transistors;
wherein the pre-charging circuit comprises a switch coupled between the terminal of the pre-charging circuit and the first output node, the second output node, and the third output node;
the device further comprising:
an inductor coupled to the switch;
a first diode coupled between the switch and the first output node;
a second diode coupled between the switch and the second output node;
a third diode coupled between the switch and the third output node; and
a controller, wherein the controller is operative to alternatingly open and close each respective pair of the first high-side switch and the first low-side switch, the second high-side switch and the second low-side switch, and the third high-side switch and the third low-side switch in at least one respective phase of operation of the driver circuit, and in the respective phase of operation activate the pre-charging circuit in dead times where both the respective high-side switch and the respective low-side switch of the respective pair are open.

2. A method comprising:
operating the device of claim 1.

3. An apparatus comprising:
a first high side switch;
a first low side switch coupled in series with the first high side switch, a node coupling the first high side switch to the first low side switch;
a controller operable to selectively control states of the first high side switch and the first low side switch to drive a first load via a circuit path from the node to the first load;
a pre-charge circuit operable to pre-charge the node while the first high side switch and the first low side switch are both in an open state;
wherein the pre-charge circuit includes a circuit pathway including a voltage source, a corresponding switch, an inductor, and a diode disposed in series; and
wherein the circuit pathway supports conveyance of current produced by the voltage source through the corresponding switch, the inductor, and the diode of the circuit path to the node while the first high-side switch and the first low-side switch are both in the open state.

4. The apparatus as in claim 3, wherein the corresponding switch is operable to convey a voltage from the voltage source through the inductor to the node while the first high side switch and the first low side switch are both in an open state.

5. The apparatus as in claim 3, wherein the first load is a winding of a motor.

6. The apparatus as in claim 3, wherein the pre-charge of the node is operable to reduce a current flowing through a body diode of the first low-side switch during a dead time when both the first high-side switch and the first low-side switch are open.

7. The apparatus as in claim 3, wherein current flows from the first load through the circuit path to the node during a dead time in which both the first high side switch and the first low side switch are both controlled to be in the open state.

8. An apparatus comprising:
a first high side switch;
a first low side switch coupled in series with the first high side switch, a node coupling the first high side switch to the first low side switch;
a controller operable to selectively control states of the first high side switch and the first low side switch to drive a first load via a circuit path from the node to the first load;
a pre-charge circuit operable to pre-charge the node while the first high side switch and the first low side switch are both in an open state;
wherein current flows from the first load through the circuit path to the node during a dead time in which both the first high side switch and the first low side switch are both controlled to be in the open state; and
wherein the pre-charge of the node is operable to speed recovery of a parasitic diode of the first low side switch, preventing current from the first load to flow through the node and the parasitic diode of the first low side switch.

9. The apparatus as in claim 8, wherein the pre-charge of the node while the first high side switch and the first low side switch are both in an open state causes current to flow from the pre-charge circuit through the node and the first load.

10. The apparatus as in claim 3, wherein the circuit pathway is operable to convey current from the voltage source to the node to pre-charge the node while the first high side switch and the first low side switch are both in the open state.

11. The apparatus as in claim 10, wherein the current flows through the node and the circuit path to the first load.

12. The apparatus as in claim 7 further comprising:
a second high-side switch;
a second low-side switch coupled in series with the second high-side switch;
wherein a combination of the first load, a second load, and the second low-side switch are coupled in series.

13. The apparatus as in claim 12, wherein a combination of the voltage source, the first load, the second load, and the second low-side switch are disposed in a series path.

14. The apparatus as in claim 13, wherein the series path supports a flow of the current while the first high-side switch and the first low-side switch are both in the open state and the second low-side switch is in a closed state.

15. The apparatus as in claim 3, wherein a series combination of the voltage source, corresponding switch, the inductor, and the diode are disposed in parallel with the first low-side switch.

\* \* \* \* \*